United States Patent [19]
Gilhousen

[11] Patent Number: 5,751,761
[45] Date of Patent: May 12, 1998

[54] SYSTEM AND METHOD FOR ORTHOGONAL SPREAD SPECTRUM SEQUENCE GENERATION IN VARIABLE DATA RATE SYSTEMS

[75] Inventor: Klein S. Gilhousen, Bozeman, Mont.

[73] Assignee: QUALCOMM Incorporated, San Diego, Calif.

[21] Appl. No.: 310,204

[22] Filed: Sep. 21, 1994

Related U.S. Application Data

[63] Continuation of Ser. No. 94,822, Jul. 20, 1993, abandoned.

[51] Int. Cl.$^6$ .............................. H04B 15/00; H04K 1/00; H04L 27/30
[52] U.S. Cl. ............................. 375/200; 370/209
[58] Field of Search ...................... 375/200, 201, 375/202, 203, 205, 206, 207, 208, 209, 210; 370/203, 208, 209, 206

[56] References Cited

U.S. PATENT DOCUMENTS

| | | | |
|---|---|---|---|
| 3,678,204 | 7/1972 | Harmuth | 370/21 X |
| 4,052,565 | 10/1977 | Baxter et al. | 375/1 X |
| 4,460,992 | 7/1984 | Gutleber | 370/19 |
| 4,494,228 | 1/1985 | Gutleber | 370/18 |
| 5,103,459 | 4/1992 | Gilhousen et al. | 375/1 |

*Primary Examiner*—Stephen Chin
*Assistant Examiner*—Hai H. Phan
*Attorney, Agent, or Firm*—Russell B. Miller; Sean English

[57] ABSTRACT

A method and system for allocating a set of orthogonal PN code sequences of variable length among user channels operative at different data rates in a spread spectrum communication system is disclosed herein. PN code sequences are constructed that provide orthogonality between users so that mutual interference will be reduced, thereby allowing higher capacity and better link performance. In an exemplary embodiment, signals are communicated between a cell-site and mobile units using direct sequence spread spectrum communication signals. Information signals communicated on the cell-to-mobile link channels are encoded, interleaved, and modulated with orthogonal covering of each information symbol. Orthogonal Walsh function codes of varying length are employed to modulate the information signals. Code assignments are made on the basis of channel data rates in a manner which results in improved utilization of the available frequency spectrum. A substantially similar modulation scheme may be employed on the mobile-to-cell link.

25 Claims, 7 Drawing Sheets

SYSTEM AND METHOD FOR ORTHOGONAL SPREAD SPECTRUM SEQUENCE GENERATION IN VARIABLE DATA RATE SYSTEMS

This is a Continuation of application Ser. No. 08/094, 822, filed Jul. 20, 1993 now abandoned.

BACKGROUND OF THE INVENTION

I. Field of the Invention

The present invention relates generally to mobile communication networks such as, for example, cellular telephone systems. More specifically, the present invention relates to a novel and improved system and method for communicating information, in mobile cellular or satellite mobile telephone systems, using spread spectrum communication signals.

II. Description of the Related Art

The use of code division multiple access (CDMA) modulation techniques is one of several methods for facilitating communications in systems accommodating a large number of users. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

The CDMA techniques as disclosed in U.S. Pat. No. 4,901,307 contemplated the use of relatively long high speed pseudonoise (PN) sequences with each user channel being assigned a different PN sequence. The cross-correlation between different PN sequences and the autocorrelation of a PN sequence for all time shifts other than zero both have a zero average value which allows the different user signals to be discriminated upon reception.

However, because such PN signals are not orthogonal mutual interference noise is created therebetween. This interference noise arises despite the fact that the cross-correlations of the PN signals average to zero, since for a short time interval such as an information bit time the cross-correlation follows a binomial distribution. As such, the user signals interfere with each other much the same as if they were wide bandwidth Gaussian noise at the same power spectral density. Accordingly, mutual interference noise arising from non-orthogonal user signals tends to limit achievable system capacity.

In U.S. Pat. No. 5,103,459, issued 1992, entitled "SYSTEM AND METHOD FOR GENERATING SIGNAL WAVEFORMS IN A CDMA CELLULAR TELEPHONE SYSTEM", also assigned to the assignee of the present invention, and which is herein incorporated by reference, there is disclosed a novel and improved method and system for constructing PN sequences that provide orthogonality between the users so that mutual interference will be reduced. Such a reduction in mutual interference allows for higher system capacity and better link performance. Since with orthogonal PN codes the cross-correlation is zero over a predetermined time interval, no mutual interference arises provided that the code time frames are aligned with each other.

In the system described in the just mentioned patent, a preferred waveform design implemented involves a direct sequence PN spread spectrum carrier. The chip rate of the PN carrier was chosen to be 1.2288 MHz in the preferred embodiment. One consideration involved in the choice of chip rate is that it be exactly divisible by the baseband data rates to be used in the system. It is also desirable for the divisor to be a power of two. In the preferred embodiment, the baseband data rate is 9600 bits per second, leading to a choice of 1.2288 MHz, 128 times 9600 for the PN chip rate.

In communications between a cellular base station and a mobile unit over the cell-to-mobile link, the code sequences used for spreading the spectrum are constructed from two different types of sequences, each with different properties to provide different functions. There is an outer code that is shared by all signals in a cell or sector that is used to discriminate between multipath signals. The outer code is also used to discriminate between signals transmitted by different cells or sectors to the mobile units. There is also an inner code that is used to discriminate between user signals transmitted within a single sector or cell.

In certain instances it may be desired that the voice channels within a cell operate at variable data rates. The intent in using a variable data rate is to lower the data rate when there is no voice activity thereby reducing interference generated by the particular voice channel to other users. In this regard U.S. Patent No. 5,414,796, issued May 9, 1995, entitled "VARIABLE RATE VOCODER", also assigned to the assignee of the present invention, discloses a vocoder producing data at four different data rates based on voice activity on a 20 msec frame basis. Exemplary data rates are 9.6 kbps, 4.8 kbps, 2.4 kbps and 1.2 kbps.

In addition to providing variable rate voice channels, it is also desired to allow various types of user channels (e.g., voice, facsimile, or high-speed data) to operate at different data rates. In such variable data rate systems it may be known in advance that the maximum data rate over a certain type of user channel will never be required to exceed some rate, e.g., 4.8 kbps, lower than a nominal system rate of 9.6 kbps. In principle, twice as many user channels should be capable of being provided at a data rate of 4.8 kbps relative to the number which could be made available at a rate of 9.6 kbps. However, if the set of orthogonal user codes were initially generated assuming a fixed transmission rate of 9.6 kbps, the available number of codes may be insufficient to support such a two-fold increase in the number of users.

Such a variable data rate system could also include user channels, such as those dedicated to high-speed data transmission, requiring data rates of double the nominal rate of 9.6 kbps, i.e., rates of 19.2 kbps. One obvious method for providing operation at 19.2 kbps would simply be to assign two Walsh channel codes to such users and divide the transmitted bits between the two channels. However, this would complicate system design by requiring that demodulators be provided for each of the two assigned Walsh codes.

It is therefore an object of the present invention to provide a Walsh coding technique enabling the orthogonal coexistence of high and low data rate channels in a spread spectrum communication system.

It is a further object of the invention that such a coding technique maximize the number of available channels by efficiently assigning codes of varying length to high and low data rate channels.

SUMMARY OF THE INVENTION

The implementation of CDMA techniques in the mobile cellular telephone environment using orthogonal PN code sequences reduces mutual interference between users, thereby allowing higher capacity and better link performance. The present invention is a novel and improved method and system for allocating a set of orthogonal PN code sequences of variable length among user channels operative at different data rates.

In an exemplary embodiment, signals are communicated between a cell-site and mobile units using direct sequence spread spectrum communication signals. Information signals communicated on the cell-to-mobile link channels are encoded, interleaved, and modulated with orthogonal covering of each information symbol. Orthogonal Walsh function codes of varying length are employed to modulate the information signals. Code assignments are made on the basis of channel data rates in a manner which results in improved utilization of the available frequency spectrum. A substantially similar modulation scheme will generally be employed on the mobile-to-cell link.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

I. System Overview

In a CDMA cellular telephone system such as is described in the above-referenced U.S. Pat. No. 5,103,459, each cell-site has a plurality of modulator-demodulator units or spread spectrum modems. Each modem consists of a digital spread spectrum transmit modulator, at least one digital spread spectrum data receiver and a searcher receiver. Each modem at the cell-site is assigned to a mobile unit as needed to facilitate communications with the assigned mobile unit.

Figure 1:
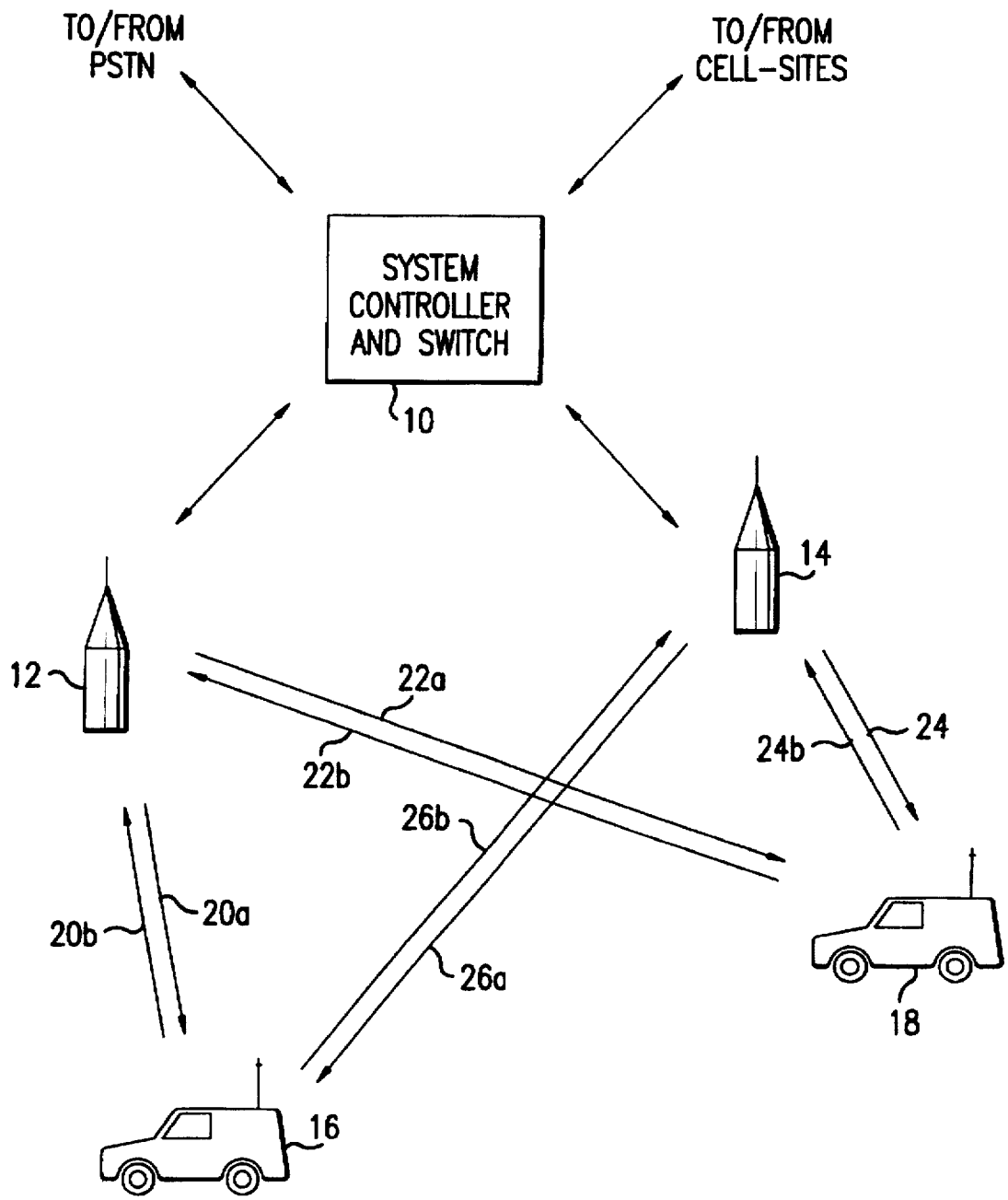
FIG. 1 is a schematic overview of an exemplary CDMA cellular telephone system.

An exemplary cellular telephone system in which the present invention is embodied is illustrated in FIG. 1. The system illustrated in FIG. 1 utilizes spread spectrum modulation techniques in communication between the system mobile units or mobile telephones, and the cell-sites. Cellular systems in large cities may have hundreds of cell-site stations serving hundreds of thousands of mobile telephones. The use of spread spectrum techniques, in particular CDMA, readily facilitates increases in user capacity in systems of this size as compared to conventional FM modulation cellular systems.

In FIG. 1, system controller and switch 10, also referred to as mobile telephone switching office (MTSO), typically includes interface and processing circuitry for providing system control to the cell-sites. Controller 10 also controls the routing of telephone calls from the public switched telephone network (PSTN) to the appropriate cell-site for transmission to the appropriate mobile unit. Controller 10 also controls the routing of calls from the mobile units, via at least one cell-site, to the PSTN. Controller 10 may connect calls between mobile users via the appropriate cell-sites since the mobile units do not typically communicate directly with one another.

Controller 10 may be coupled to the cell-sites by various means such as dedicated telephone lines, optical fiber links, or microwave communication links. In FIG. 1 two such exemplary cell-sites 12 and 14 are shown along with mobile units 16 and 18, where each of the units 16 and 18 include a cellular telephone. Cell-sites 12 and 14 as discussed herein and as illustrated in the drawings are considered to service an entire cell. However, it should be understood that the cell may be geographically divided into sectors with each sector treated as a different coverage area. Accordingly, handoffs are generally required to be made between sectors of a same cell, while diversity may also be achieved between sectors as is done between cells.

In FIG. 1, arrowed lines 20a-20b and 22a-22b respectively define the possible communication links between cell-site 12 and mobile units 16 and 18. Similarly, arrowed lines 24a-24b and 26a-26b respectively define the possible communication links between cell-site 14 and mobile units 16 and 18. Cell-sites 12 and 14 nominally transmit using equal power.

The cell-site service areas or cells are designed in geographic shapes such that the mobile units will normally be closest to one cell-site, and within one cell sector should the cell be divided into sectors. When the mobile unit is idle, i.e. no calls in progress, the mobile unit constantly monitors pilot signal transmissions from each nearby cell-site, and if applicable from a single cell-site in which the cell is sectorized. As illustrated in FIG. 1, the pilot signals are respectively transmitted to mobile unit 16 by cell-sites 12 and 14 upon outbound or forward communication links 20a and 26a. Mobile unit 16 can determine which cell it is in by comparing signal strength in pilot signals transmitted from cell-sites 12 and 14.

In the example illustrated in FIG. 1, mobile unit 16 may be considered closest to cell-site 12. When mobile unit 16 initiates a call, a control message is transmitted to the nearest cell-site, cell-site 12. Cell-site 12, upon receiving the call request message, transfers the called number to system controller 10. System controller 10 then connects the call through the PSTN to the intended recipient.

Should a call be initiated within the PSTN, controller 10 transmits the call information to all the cell-sites in the area. The cell-sites in return transmit a paging message within each respective coverage area that is intended for the called recipient mobile user. When the intended recipient mobile unit hears the page message, it responds with a control message that is transmitted to the nearest cell-site. This control message signals the system controller that this particular cell-site is in communication with the mobile unit. Controller 10 then routes the call through this cell-site to the mobile unit. Should mobile unit 16 move out of the coverage area of the initial cell-site 12, an attempt is made to continue the call by routing the call through another cell-site.

With respect to cellular telephone systems, The Federal Communications Commission (FCC) has allocated a total of 25 MHz for mobile-to-cell links and 25 MHz for cell-to-mobile links. The FCC has divided the allocation equally between two service providers, one of which is the wireline telephone company for the service area and the other chosen by lottery. Because of the order in which allocations were made, the 12.5 MHz allocated to each carrier for each direction of the link is further subdivided into sub-bands. For the wireline carriers, the sub-bands are each 10 MHz and 2.5 MHz wide. For the non-wireline carriers, the sub-bands are each 11 MHz and 1.5 MHz wide. Thus, a signal bandwidth of less than 1.5 MHz could be fit into any of the sub-bands, while a bandwidth of less than 2.5 MHz could be fit into all but one sub-band.

To preserve maximum flexibility in allocating the CDMA technique to the available cellular frequency spectrum, the waveform utilized in the cellular telephone system should be less than 1.5 MHz in bandwidth. A good second choice would be a bandwidth of about 2.5 MHz, allowing full flexibility to the wireline cellular carriers and nearly full flexibility to non-wireline cellular carriers. While using a wider bandwidth has the advantage of offering increased multipath discrimination, disadvantages exist in the form of higher equipment costs and lower flexibility in frequency assignment within the allocated bandwidth.

In a spread spectrum cellular telephone system, such as illustrated in FIG. 1, the preferred waveform design implemented involves a direct sequence pseudonoise spread spectrum carrier. The chip rate of the PN sequence is chosen to be 1.2288 MHz in the preferred embodiment. This particular chip rate is chosen so that:

(i) the resulting bandwidth thereof, about 1.25 MHz after filtering, is approximately one-tenth of the total bandwidth allocated to one cellular service carrier; and (ii) it may be accommodated by the smallest, i.e., the 1.5 MHz, frequency sub-band mentioned above.

Another consideration in the choice of the exact chip rate is that it is desirable that the chip rate be exactly divisible by the baseband data rates to be used in the system. It is also desirable for the divisor to be a power of two. In an exemplary embodiment, at least one user channel operates at a baseband date rates of 9600 bits per second, leading to a choice of 1.2288 MHz, 128 times 9600 for the PN chip rate. Other channels utilize baseband data rates which are multiples or sub-multiples of the 9600 rate.

In the cell-to-mobile link, the binary sequences used for spreading the spectrum are constructed from two different types of sequences, each with different properties to provide different functions. There is an outer code that is shared by signals in a cell or sector that is used to discriminate between multipath signals. The outer code is also used to discriminate between signals transmitted by different cells or sectors to the mobile units. There is also an inner code that is used to discriminate between user signals transmitted by a single sector or cell. As is described hereinafter, one aspect of the present invention is directed to an improved method for allocating such inner codes among the various user channels within a particular sector or cell.

The carrier waveform design in the preferred embodiment for the cell-site transmitted signals utilizes a sinusoidal carrier that is quadraphase (four phase) modulated by a pair of binary PN sequences that provide the outer code transmitted by a single sector or cell. As is described hereinafter, modulation is also provided by an inner code formulated in accordance with the invention. The outer code sequences are generated by two different PN generators of the same sequence length. Once sequence bi-phase modulates the in-phase channel (I Channel) of the carrier and the other sequence bi-phase modulates the quadrature-phase (Q Channel) of the carrier. The resulting signals are summed to form a composite four-phase carrier.

Although the values of a logical "zero" and a logical "one" are conventionally used to represent the binary sequences, the signal voltages used in the modulation process are +V volts for a logical "one" and −V volts for a logical "zero". To bi-phase modulate a sinusoidal signal, a zero volt average value sinusoid is multiplied by the +V or −V voltage level as controlled by the binary sequences using a multiplier circuit. The resulting signal may then be band limited by passing through a bandpass filter. It is also known in the art to lowpass filter the binary sequence stream prior to multiplying by the sinusoidal signal, thereby interchanging the order of the operations. A quadraphase modulator consists of two bi-phase modulators each driven by a different sequence, with the sinusoidal signals used in the bi-phase modulators having a 90° phase shift therebetween.

In the preferred embodiment, the sequence length for the transmitted signal carrier is chosen to be 32,768 chips. Sequences of this length can be generated by a modified maximal-length linear sequence generator by adding a zero bit to a length 32,767 chip sequence. The resulting sequence has good cross-correlation and autocorrelation properties. Good cross-correlation and autocorrelation properties are necessary to prevent mutual interference between pilot carriers transmitted by different cells.

A sequence this short in length is desirable in order to minimize acquisition time of the mobile units when they first enter the system without knowledge of system timing. With unknown timing, the entire length of the sequence must be searched to determine the correct timing. The longer the sequence, the longer time the acquisition search will require. Although sequences shorter than 32,768 could be used, it must be understood that as sequence length is reduced the code processing gain may be diminished. As processing gain diminishes, the rejection of multipath interference along with interference from adjacent cells and other sources will also be reduced, perhaps to unacceptable levels. Thus, there is a desire to use the longest sequence that can be acquired in a reasonable time. It is also desirable to use the same code polynomials in all cells so that the mobile unit, not knowing what cell it is in when initially acquiring synchronization, can obtain full synchronization by searching a single code polynomial.

In order to simplify the synchronization process, all the cells in the system are synchronized to each other. In the exemplary embodiment, cell synchronization is accomplished by synchronizing all the cells to a common time reference, the Navstar Global Positioning System satellite navigation system which is itself synchronized to Universal Coordinated Time (UTC).

Signals from different cells are differentiated by providing time offsets of the basic sequences. Each cell is assigned a different time offset of the basic sequences differing from its neighbors. In the preferred embodiment, the 32,768 repetition period is divided into a set of 512 timing offsets. The 512 offsets are spaced 64 chips apart. Each sector of each cell in a cellular system is assigned a different one of the offsets to use for all its transmissions. If there are more than 512 sectors or cells in the system, then the offsets can be reused in the same manner as frequencies are reused in the present analog FM cellular system. In other designs, a different number than 512 offsets could be used. With reasonable care in assignment of pilot offsets, it should never be necessary for near neighboring cells to use near neighboring time offsets.

All signals transmitted by an omnidirectional cell or one of the sectors of a sectored cell share the same outer PN codes for the I and Q channels. The signals are also spread with an inner orthogonal code generated by using Walsh functions. A signal addressed to a particular user is multiplied by the outer PN sequences and by a particular Walsh sequence, or sequence of Walsh sequences, assigned by the system controller for the duration of the user's telephone call. The same inner code is applied to both the I and Q channels resulting in a modulation which is effectively bi-phase for the inner code.

It is well known in the art that a set of n orthogonal binary sequences, each of length n, for n any power of 2 can be constructed, see *Digital Communications with Space Applications*, S. W. Golomb et al., Prentice-Hall, Inc., 1964, pp. 45–64. In fact, orthogonal binary sequence sets are also known for most lengths which are multiples of four and less than two hundred. One class of such sequences that is easy to generate is called the Walsh function, also known as Hadamard matrices.

A Walsh function of order n can be defined recursively as follows:

$$W(n) = \begin{vmatrix} W(n/2), W(n/2) \\ W(n/2), W'(n/2) \end{vmatrix} \quad (1)$$

where W' denotes the logical complement of W, and W(1) =0. Thus, $$W(2) = \begin{vmatrix} 00 \\ 01 \end{vmatrix} \text{ and } W(4) = \begin{vmatrix} 0000 \\ 0101 \\ 0011 \\ 0110 \end{vmatrix}$$

W(8) is as follows:

$$W(8) = \begin{vmatrix} 00000000 \\ 01010101 \\ 00110011 \\ 01100110 \\ 00001111 \\ 01011010 \\ 00111100 \\ 01101001 \end{vmatrix}$$

A Walsh sequence or code is one of the rows of a Walsh function matrix. A Walsh function of order n contains n code sequences, each of length n bits.

A Walsh function of order n (as well as other orthogonal functions) has the property that over the interval of n code symbols, the cross-correlation between all the different sequences within the set is zero, provided that the sequences are time aligned with each other. This can be seen by noting that every sequence differs from every other sequence in exactly half of the bits. It should also be noted that there is always one sequence containing all zeroes and that all the other sequences contain half ones and half zeroes.

Neighboring cells and sectors can reuse the Walsh sequences because the outer PN codes used in neighboring cells and sectors are distinct. Because of the differing propagation times for signals between a particular mobile's location and two or more different cells, it is not possible to satisfy the condition of time alignment required for Walsh function orthogonality for both cells at one time. Thus, reliance must be placed on the outer PN code to provide discrimination between signals arriving at the mobile unit from different cells. However, all the signals transmitted by a cell are orthogonal to each other and thus do not contribute interference to each other. This eliminates the majority of the interference in most locations, allowing a higher capacity to be obtained.

The system further envisions the voice channel to be a variable rate channel whose data rate can be varied from data block to data block with minimum of overhead required to control the data rate in use. The use of variable data rates reduces mutual interference in neighboring cells, and saves cell power, by eliminating unnecessary transmissions when there is no useful speech to be transmitted. Algorithms are utilized within the vocoders for generating a varying number of bits in each vocoder block in accordance with variations in speech activity. During active speech, the vocoder may produce 20 msec. data blocks containing, 20, 40, 80, or 160 bits, depending on the voice activity of the speaker. It is desired to transmit the data blocks in a fixed amount of time by varying the rate of transmission. It is further desirable not to require signalling bits to inform the receiver how many bits are being transmitted.

Although the present invention is described hereinafter in the context of the cell-to-mobile link within the communication system of FIG. 1, it is understood that the mobile-to-cell link may be similarly implemented in accordance with the teachings herein. In the preferred embodiment, orthogonal Walsh functions of varying length are assigned to user channels on the cell-to-mobile link. In particular, each channel is assigned a unique orthogonal Walsh sequence having a length predicated on the channel data rate. In the case of voice channels, the digital symbol stream for each voice signal is multiplied by its assigned Walsh sequence. The Walsh coded symbol stream for each voice channel is then multiplied by the outer PN coded waveform. The resultant spread symbol streams are then added together to form a composite waveform.

The resulting composite waveform is then modulated onto a sinusoidal carrier, bandpass filtered, translated to the desired operating frequency, amplified and radiated by the antenna system. Alternate embodiments of the present invention may interchange the order of some of the just described operations for forming the cell-site transmitted signal. For example, it may be preferred to multiply each voice channel by the outer PN coded waveform and perform the filter operation prior to summation of all the channel signals to be radiated by the antenna. It is well known in the art that the order of linear operations may be interchanged to obtain various implementation advantages and different designs.

The waveform design of the preferred embodiment for cellular service uses the pilot carrier approach for the cell-to-mobile link, as is described in U.S. Pat. No. 4,901,307. All cells transmit pilot carriers using the same 32,768 length sequence, but with different timing offsets to prevent mutual interference.

As is described in greater detail below, the symbol stream for a particular cellular user is combined in a first exclusive OR operation with the Walsh sequence assigned to the user. The Walsh function is clocked at a rate of 1.2288 MHz, while in an exemplary variable data rate system including voice, facsimile (FAX), and high/low-speed data channels the information symbol rate may vary from approximately 75 Hz to 76.800 Hz. The resultant coded waveform is combined in a second exclusive OR operation with a binary PN sequence also clocked at 1.2288 MHz. An identical binary PN sequence is used to encode each mobile channel within a particular sector of the coverage area of the cellular system. As a consequence of the orthogonality of the Walsh coding sequences, each may be used on a single RF channel associated with such a sector without inducing interference among the users within the sector.

The signals carried by each channel may further be convolutionally encoded, with repetition, and interleaved in order to provide error detection and correction functions which allow the system to operate at a much lower signal-to-noise and interference ratio. Techniques for convolutional encoding, repetition and interleaving are well known in the art. The resulting signals are then generally modulated onto an RF carrier and summed with the pilot and setup carriers, along with the other voice carriers. Summation may be accomplished at several different points in the processing such as at the IF frequency, or at the baseband frequency either before or after multiplication by the PN sequence associated with the channels within a particular cell.

Each voice carrier may also be multiplied by a value that sets its transmitted power relative to the power of the other voice carriers. This power control feature allows power to be allocated to those links that require higher power due to the intended recipient being in a relatively unfavoring location. Means are provided for the mobiles to report their received signal-to-noise ratio to allow the power to be set at a level so as to provide adequate performance without waste. The orthogonality property of the Walsh functions is not disturbed by using different power levels for the different voice carriers provided that time alignment is maintained.

II. Variable-Length Walsh Sequence Coding

In the system described in U.S. Pat. No. 5,103,459, a maximum of 61 users with three overhead channels were capable of being accommodated in a given cell sector when each channel was coded using a unique Walsh sequence of length 64. In accordance with the invention, user channels are assigned codes of varying length based on the data rate of each channel. This allows orthogonal coding of a larger number of users within a given sector by allowing more orthogonal codes to be used than when codes are constrained to be of a fixed length. It should be understood that while in the exemplary embodiment, 64 Walsh sequences are used, more or less channels may be formed using other orders of Walsh functions in other systems with the teaching of the present invention applicable.

As may be appreciated with reference to the recursive formula for generating Walsh functions set forth by equation (1), Walsh function matrices of progressively higher order are derived from lower-order Walsh matrices. Since a Walsh sequence corresponds to a particular row within a Walsh function matrix, it is possible to form a table, or "tree", of Walsh sequences through recursive application of equation (1).

Figure 2:
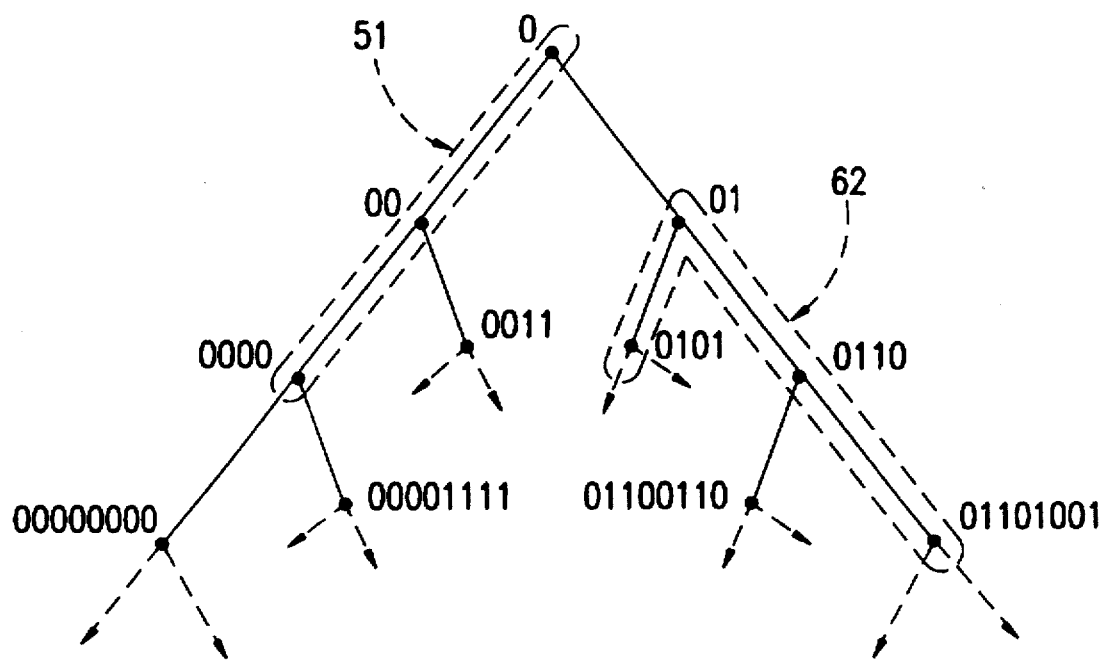
FIG. 2 provides an illustrative representation of a tree of Walsh sequences from which a set of orthogonal Walsh codes of varying length may be derived.

FIG. 2 provides an illustrative representation of a tree of Walsh sequences in which the lowest order Walsh sequence of the tree, i.e., the "root" sequence, is equivalent to "0". Such a tree of Walsh sequences may be envisioned as a set of interconnected nodes each having two branches, where all of the nodes may be traced back to the root node. Assuming the first order Walsh sequence used to define the root node is denoted as $W_0(1)$, then the two branches from this root node will be connected to a pair of nodes defined by the Walsh sequences "00" and "01", which comprise the rows of the Walsh function matrix $W_0(2)$. As is indicated by FIG. 2, this process may be continued by deriving a Walsh function matrix $W_1(2)$ by substituting $W_1(1)=00$ into equation (1). This results in the node "00"branching into the nodes "0000" and "0101", which comprise the rows of $W_1(2)$. A similar recursive substitution yields branch nodes "0101" and "0110" from node "01".

It should be noted that sequences more complex than "0" can be used to define the root node of a tree of Walsh sequences. For example, if it were desirable for the number of chips in the mobile channel codes to be a multiple of three, then the sequence "010" could be used for the root of the tree. The Walsh sequences associated with the remaining nodes of the tree would then be derived as before via recursive application of equation (1).

Clearly, the Walsh sequence defining a node of the tree branching from a given node is not orthogonal to the Walsh sequence associated with the given node. It follows that assignment to a mobile channel of a Walsh sequence corresponding to a particular node would preclude assignment of Walsh sequences associated with nodes connected, either above or below the given node, by a set of branches not including any "turns", i.e., directional changes. However, any other Walsh sequences defining nodes not connected to the given node in this manner could be simultaneously used as codes to identify other mobile channels.

One way of characterizing particular sets of nodes capable of simultaneous assignment is in terms of a "family tree". In this context the nodes linearly above a particular node correspond to the "ancestors" of that node, while those nodes linearly below the node may be described as "descendants". Nodes which are lineal ancestors or descendants of a given node are not orthogonal to the node. Conversely, all other nodes in the tree are orthogonal to the given node. For example, each of the nodes in FIG. 2 within the group G1 may be considered to be lineally-related and hence ineligible for simultaneous assignment. In contrast, neither node "0110"nor node "01101001" within group G2 is lineally-related to node "0101". Accordingly, these Walsh sequence codes would be capable of being contemporaneously allocated to channels of differing data rates.

A set of Walsh sequence codes derived from the Walsh tree representation of FIG. 2 is set forth below in Table I. Included within Table I are Walsh sequence codes derived from Walsh function matrices W(1), W(2), W(4), W(8), and W(16), where, again, W(1)=0 corresponds to the root node in FIG. 2. Each Walsh code sequence is identified by a Code Label, X/Y, wherein Y represents the length (in chips) of the code and X denotes a code number ($0 \leq X \leq Y-1$). Although the maximum length of the code sequences included within Table I is 16 chips, it is clear that longer sequences could be derived through repeated recursive application of equation (1).

TABLE I

| Code Label (X/Y) | Code |
|---|---|
| 0/1 | 0 |
| 0/2 | 00 |
| 1/2 | 01 |

TABLE I-continued

| Code Label (X/Y) | Code |
| --- | --- |
| 0/4 | 0000 |
| 1/4 | 0101 |
| 2/4 | 0011 |
| 3/4 | 0110 |
| 0/8 | 00000000 |
| 1/8 | 01010101 |
| 2/8 | 00110011 |
| 3/8 | 01100110 |
| 4/8 | 00001111 |
| 5/8 | 01011010 |
| 6/8 | 00111100 |
| 7/8 | 01101001 |
| 0/16 | 0000000000000000 |
| 1/16 | 0101010101010101 |
| 2/16 | 0011001100110011 |
| 3/16 | 0110011001100110 |
| 4/16 | 0000111100001111 |
| 5/16 | 0101101001011010 |
| 6/16 | 0011110000111100 |
| 7/16 | 0110100101101001 |
| 8/16 | 0000000011111111 |
| 9/16 | 0101010110101010 |
| 10/16 | 0011001111001100 |
| 11/16 | 0110011010011001 |
| 12/16 | 0000111111110000 |
| 13/16 | 0101101010100101 |
| 14/16 | 0011110011000011 |
| 15/16 | 0110100110010110 |

If orthogonality is to be maintained between a set of user channels assigned Walsh codes from Table I, then codes associated with branch-connected nodes in the Walsh tree representation of FIG. 2 may not be simultaneously utilized. That is, neither longer code sequences recursively derived from a given code in accordance with equation (1), nor shorter code sequences from which the given code was recursively derived, may be assigned to other communication channels when the given code is in use. In an exemplary embodiment, Walsh sequence codes of the longest available length (i.e., 16 chips in a system utilizing the coding scheme of Table I) are assigned to the channels having the lowest data rate. Illustratively, codes 0/16 through 15/16 could be assigned to low data rate channels in which a single data symbol is transmitted during each 16 code chips. Other system channels requiring twice this lowest data rate could then be allocated one of the codes from 0/8 to 7/8.

As an example, assume code 4/8 has been assigned to a user channel transmitting information symbols at twice the lowest data rate. As a consequence of this assignment codes 4/16 and 12/16 could not be allocated to lower data rate channels, since these codes correspond to the rows of the Walsh function matrix created by substituting code 4/8 into equation (1). Similarly, codes 0/2 and 0/4 could not be assigned to higher data rate channels since code 4/8 could be derived therefrom.

As an additional example, assume code 1/4 is assigned to a channel operating at four times the lowest data rate. This assignment would preclude the allocation of channels 1/8, 5/8, 1/16, 5/16, 9/16, and 13/16 to lower data rate channels and code 1/2 to higher data rate channels. It is noted that the use of code 0/1 prohibits the assignment of any other code because each of the remaining codes could be derived from code 0/1.

III. Channel Assignment of Variable-Length Walsh Codes

In the preferred embodiment, a cell controller monitors existing Walsh code assignments in order to enable additional requests for channels codes to be efficiently accommodated. This monitoring could be effected by, for example, annotating a tabular list of the Walsh code sequences each time a code is assigned to a particular channel. When it is desired to initiate an additional code assignment, a set of potentially assignable codes are identified by searching the list. This set of codes would include only those codes not recursively related by equation (1) to a currently assigned code. That is, the set would include only those codes not capable of being derived from an assigned code, and the codes from which the assigned code is capable of being derived.

Subsequent to selection of a particular code, all codes recursively related in the above-described manner to the selected code would be marked unavailable. When communication over a particular channel is terminated, such as at the conclusion of a telephone call made over a voice channel, the unavailable designation would be removed from the corresponding channel code. However, prior to marking the corresponding channel code as available it would need to be determined that any potentially conflicting codes were not currently assigned.

In a particular implementation the cell controller would maintain an ASSIGNED list of the set of codes already assigned to particular user channels, and would further include a separate "BUSY" list having an entry for each possible Walsh code. When a request for a channel code is made, the controller would first reset, i.e., clear, the BUSY list. Each of the entries in the BUSY list corresponding to codes currently included in the ASSIGNED list would then be marked as being busy. In addition, all entries within the BUSY list corresponding to codes recursively related to those indicated as being busy would also be marked as being busy. Next, the BUSY list would be searched for an available code having a chip length appropriate for the data rate of the requesting channel. This information could be by provided by, for example, a LENGTH table within the cell controller specifying the codes suitable for allocation to channels operative at various data rates. Upon identification of a code of suitable length, the controller would assign the identified code to the requesting channel. At the conclusion of channel communication the assigned code is deleted from the ASSIGNED list.

After extended periods of system operation the particular set of Walsh codes included in the ASSIGNED list may inefficiently limit the number of remaining available channels. For example, random assignment of codes to low data rate channels may preclude allocation of a large number of shorter-length codes, recursively related to the randomly assigned longer-length codes, to high data rate channels. Accordingly, it will generally be advantageous to assign codes to low data rate users in such a way as to minimize the number of disqualified shorter-length codes. In particular implementations this could be effected by, for example, initially assigning those longer-length codes recursively related by equation (1) to shorter-length codes included on the BUSY list of disqualified codes. Only after all such longer-length codes had been assigned would codes not so recursively related be considered for allocation to low data rate users. Moreover, it is expected to be advantageous to assign users operative at a particular data rate to closely related codes so as to minimize the number of high data rate, i.e., shorter-length, codes marked as unavailable. The availability of short-length codes may be further increased by reassigning codes among active lower data rate channels so that all eligible longer-length codes lineally-related to a given shorter-length code are used prior to allocation of codes not lineally-related to the shorter-length code.

IV. Apparatus for Variable-Length Walsh Coding in a Cellular System

Figure 3:
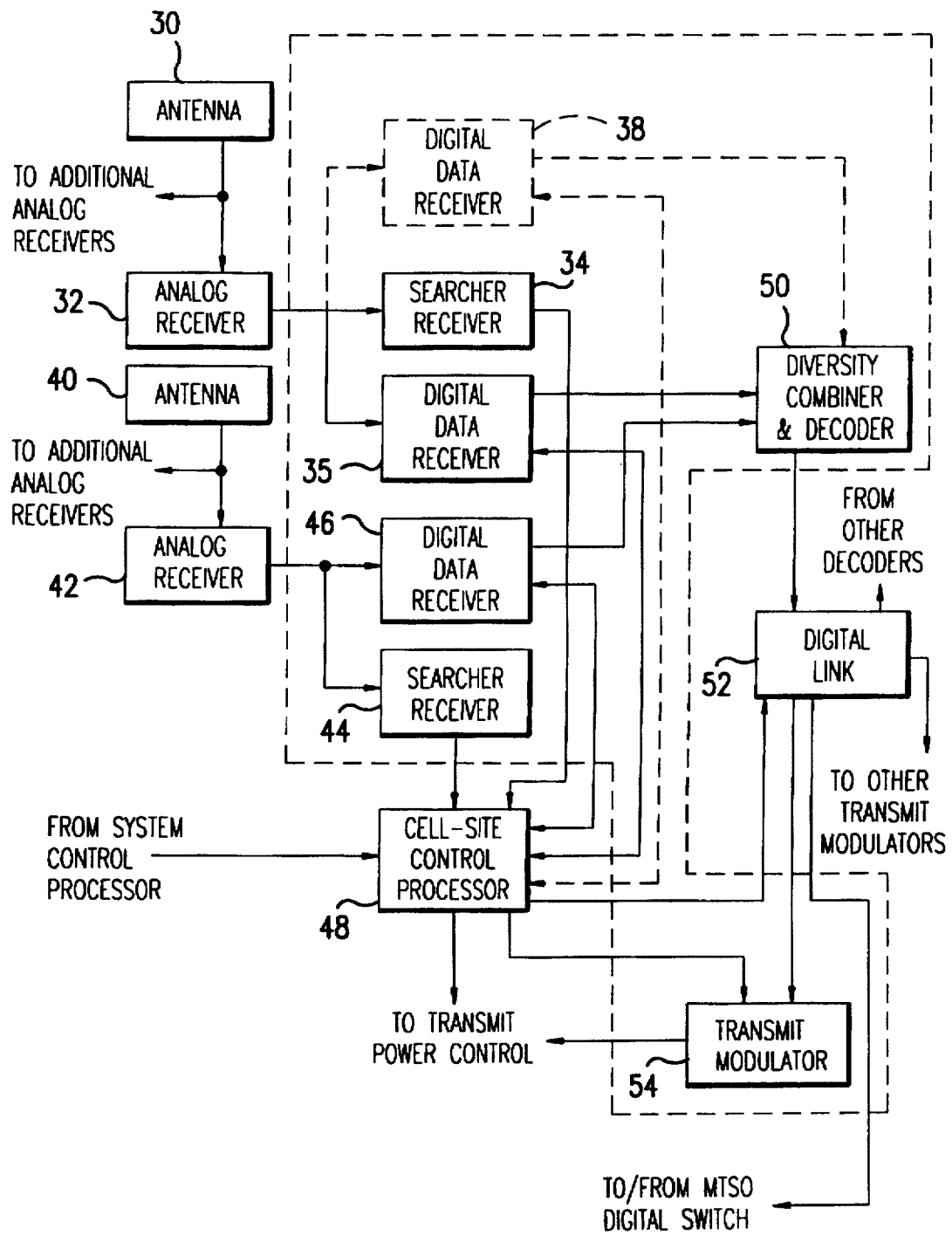
FIG. 3 is a block diagram of the cell-site equipment as implemented in the CDMA cellular telephone system.

FIG. 3 illustrates in block diagram form an exemplary embodiment of cell-site equipment. At the cell-site, two receiver systems are utilized with each having a separate antenna and analog receiver for space diversity reception. In each of the receiver systems the signals are processed identically until the signals undergo a diversity combination process. The elements within the dashed lines correspond to elements corresponding to the communications between the cell-site and one mobile unit. The output of the analog receivers are also provided to other elements used in communications with other mobile units.

In FIG. 3, the first receiver system is comprised of antenna 30, analog receiver 32, searcher receiver 34 and digital data receiver 36. The first receiver system may also include an optional digital data receiver 38. The second receiver system includes antenna 40, analog receiver 42, searcher receiver 44 and digital data receiver 46. Although not fully illustrated, it is preferred that there be multiple digital data receivers (e.g. two to four) associated with each analog receiver for cell-site circuitry (illustrated in dashed lines) assigned for communication with a particular mobile unit. Although not shown it should further be understood that the data receivers may be assigned to process the signal from either or both of the analog receivers.

The cell-site also includes cell-site control processor 48. Control processor 48 is coupled to data receivers 36, 38, and 46 along with searcher receivers 34 and 44. Control processor 48 provides among other functions, functions such as signal processing; timing signal generation; power control; and control over handoff, diversity, combining and system control processor interface with the MTSO. Walsh sequence assignment along with transmitter and receiver assignment is also provided by control processor 48. In a preferred embodiment, the control processor 48 will include a table of orthogonal Walsh code sequences, generated recursively as described above, of chip lengths ranging from 2 to 1024. This range of sequence length enables orthogonal Walsh codes to be provided for data rates with rate one-half convolutional coding of between 600 bps and 307200 bps, it being understood that Walsh codes of longer length could be generated to facilitate transmission at even lower data rates. After a Walsh sequence has been selected using the BUSY and ASSIGNED tables, it is assigned by control processor 48 at call setup time in the same manner as channels are assigned to calls in the analog FM cellular system.

Both receiver systems are coupled by data receivers 36, 38, and 46 to diversity combiner and decoder circuitry 50. Digital link 52 is coupled to receive the output of diversity combiner and decoder circuitry 50. Digital link 52 is also coupled to control processor 48, cell-site transmit modulator 54 and the MTSO digital switch. Digital link 52 is utilized to communicate signals to and from the MTSO with cell-site transmit modulator 54 and circuitry 50 diversity combiner and decoder under the control of control processor 48.

Figure 4:
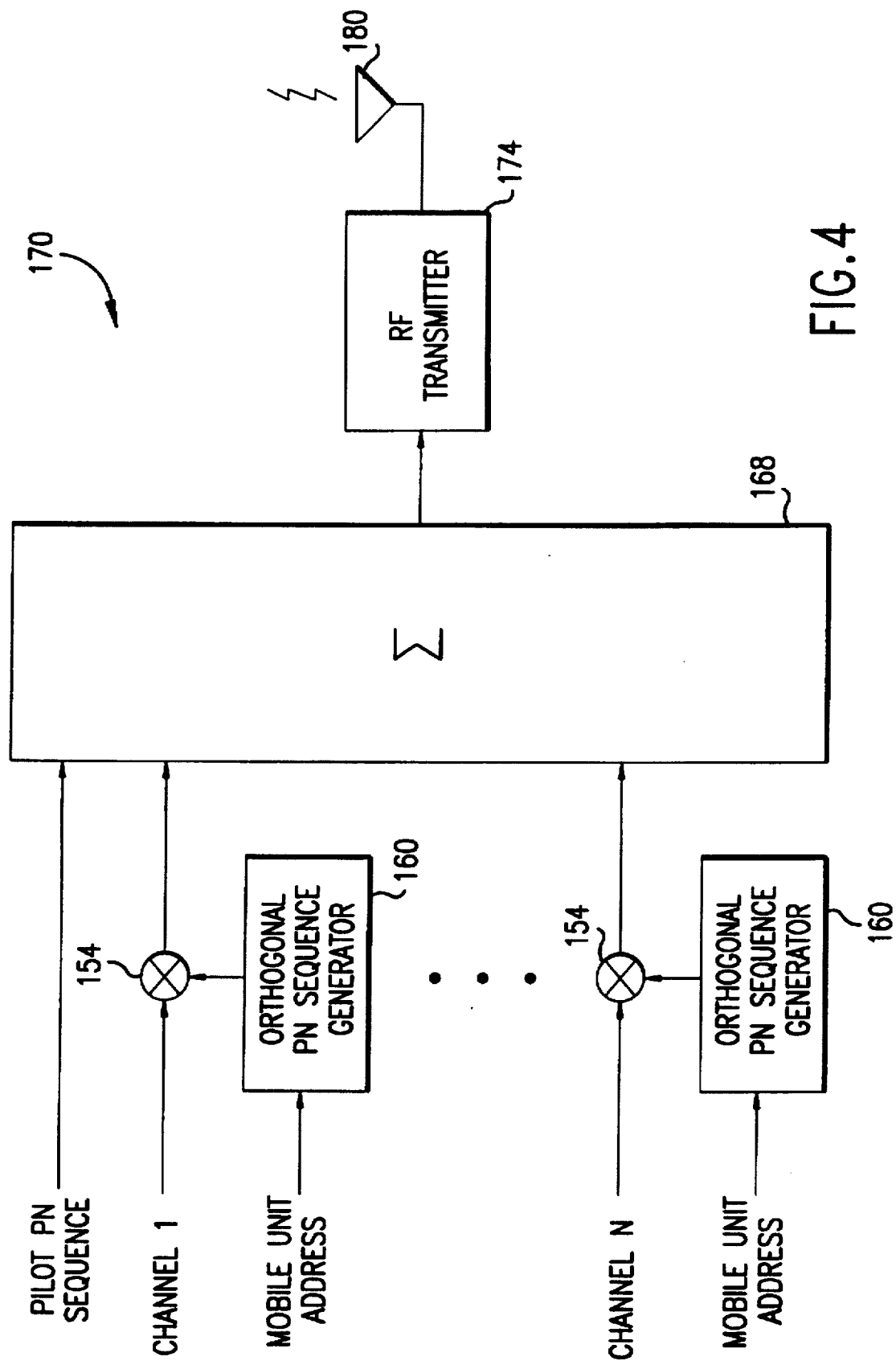
FIG. 4 is a simplified block diagram of a signal transmission subsystem to which reference will be made in describing generation of the mobile unit transmitted signals.

FIG. 4 is a simplified block diagram of a signal transmission subsystem 150 to which reference will be made in describing generation of the mobile unit transmitted signals. As shown in FIG. 4, baseband data corresponding to channels 1, 2, ... N, is provided to a plurality of multipliers 154. The baseband data signals are modulated by a set of orthogonal PN sequences provided by orthogonal PN sequence generators 160. Each of the PN signals is synthesized on the basis of an address of a particular mobile unit and is clocked at a predetermined rate, which in the preferred embodiment is 1.2288 MHz. This clock rate is chosen to be an integer multiple of one of the baseband data rates, e.g., 9.6 kbps. As is described in detail below, data from each voice channel is also encoded with repetition, interleaved, scrambled, and multiplied by its assigned Walsh code sequence.

Referring again to FIG. 4, the set of orthogonal PN spread data signals produced by multipliers 154 are supplied to a summation network 168. Within the summation network 168 this set of orthogonal data signals is further spread by a pilot PN sequence associated with a particular cellular region. The spread spectrum data generated by summation network 168 is utilized by an RF transmitter in modulating an RF carrier provided to an antenna 180. The RF transmission from the antenna 180 is used to communicate the set of direct sequence spread spectrum signals produced by subsystem 150 to the various mobile units within the associated cellular region.

In the exemplary embodiment of the present invention, the voice channel utilizes a variable data rate. The intent in using a variable data rate is to lower the data rate when there is no voice activity thereby reducing interference generated by this particular voice channel to other users. The vocoder envisioned to provide variable rate data is disclosed in the above-referenced copending U.S. patent application entitled "VARIABLE RATE VOCODER". Again, such a vocoder produces data at four different data rates based on voice activity on a 20 msec frame basis (e.g., 9.6 kbps, 4.8 kbps, 2.4 kbps and 1.2 kbps). Although the data rate will vary on a 20 msec basis, the code symbol rate is kept constant by code repetition at 19.2 ksps. It is noted that utilization of 19.2 ksps generally presupposes a nominal maximum data rate of 9.6 kbps. Accordingly, at an information bit rate of 9.6 kbps there is no repetition of the convolutional code symbols produced by the vocoder. At a bit rate of 4.8 kbps each code symbol is repeated twice, while at bit rates of 2.4 kbps and 1.2 kbps the code symbols are repeated four times and eight times, respectively.

Since the variable rate scheme is devised to reduce interference, the code symbols at the lower rates will have lower energy. For example, for the exemplary data rates of 9.6 kbps, 4.8 kbps, 2.4 kbps and 1.2 kbps, the code symbol energy ($E_s$) is respectively $E_b/2$, $E_b/4$, $E_b/8$ and $E_b/16$ where $E_b$ is the information bit energy for the 9.6 kbps transmission rate.

The code symbols are interleaved by a convolutional interleaver such that code symbols with different energy levels will be scrambled by the operation of the interleaver. In order to keep track of what energy level a code symbol should have a label is attached to each symbol specifying its data rate for scaling purposes. After orthogonal Walsh covering and PN spreading, the quadrature channels are digitally filtered by a Finite Impulse Response (FIR) filter. The FIR filter will receive a signal corresponding to the symbol energy level in order to accomplish energy scaling according to the data rate. The I and Q channels will be scaled by factors of: 1, $1/\sqrt{2}$, 1/2, or $1/2\sqrt{2}$. In one implementation the vocoder would provide a data rate label in the form of a 2-bit number to the FIR filter for controlling the filter scaling coefficient.

Figure 5:
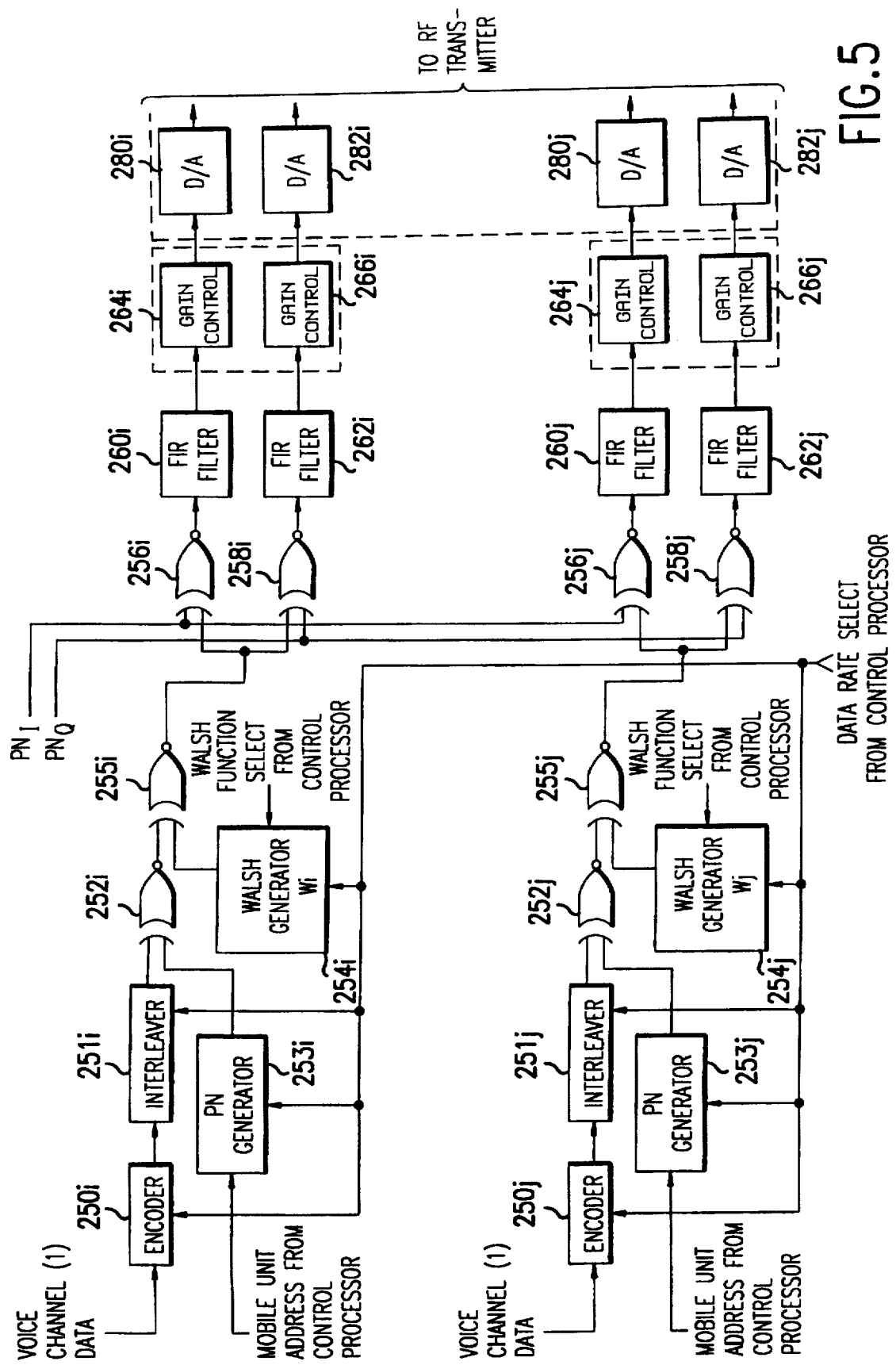
FIG. 5 is a block diagram of the transmission circuitry for two exemplary voice channels.

In FIG. 5, the circuitry of two exemplary voice channels, voice channels (i) and (j) are illustrated. The voice channel (i) data is input from an associated vocoder (not shown) to transmit modulator 54 (FIG. 3). Transmit modulator 54 is comprised of encoder $250_i$, interleaver $251_i$, exclusive-OR gates $252_i$, $255_i$, $256_i$, and $258_i$, PN generator $253_i$, and Walsh generator ($W_i$) $254_i$. Data Rate Select signals, indicative of the lengths of the Walsh codes assigned to channels (i) and (j), are provided by control processor 48 to each of the elements within the modulator 54.

The voice channel (i) data is input to encoder 250i where in the exemplary embodiment it is convolutionally encoded with code symbol repetition in accordance with the input data rate and sequence length of the assigned Walsh code. The encoded data is then provided to interleaver 251i where, in the exemplary embodiment, it is convolutionally interleaved. Interleaver 251i also receives from the vocoder associated with the voice channel (i) a 2-bit data rate label that is interleaved with the symbol data to identify the data rate to the FIR filters. The data rate label is not transmitted. At the mobile unit, the decoder checks for all possible codes. The interleaved symbol data is output from interleaver 251i at an exemplary rate of 19.2 ksps to an input of exclusive-OR gate 251i.

In the exemplary embodiment, each voice channel signal is scrambled to provide greater security in cell-to-signal mobile transmissions. Although such scrambling is not required it does enhance the security in communications. For example, scrambling of the voice channel signals may be accomplished by PN coding the voice channel signals with a PN code determined by the mobile unit address of user ID. Such PN scrambling may be provided by the PN generators $253_i$ and $253_j$ (FIG. 5) using a suitable PN sequence or encryption scheme. Although in the preferred embodiment, scrambling is performed using a PN sequence, scrambling may be accomplished by other techniques including those well known in the art.

Referring again to FIG. 5, scrambling of the voice channel (i) signal may be accomplished by providing PN generator $253_i$ which receives the assigned mobile unit address from the control processor. PN generator $253_i$ generates a unique PN code that is provided as the other input to exclusive-OR gate $251_i$. The output of exclusive-OR gate $251_i$ is then provided to one input of exclusive-OR gate $255_i$.

Walsh generator ($W_i$) $254_i$ generates, in response to a function select signal and timing signals from the control processor, a signal corresponding to the Walsh sequence assigned to channel (i). The value of the function select signal may be determined by the address of the mobile unit. The Walsh sequence signal is provided as the other input to exclusive-OR gate $255_i$. The scrambled symbol data and Walsh sequence are exclusive-OR'ed by exclusive-OR gate $255_i$ with the result provided as an input to both of exclusive-OR gates $256_i$ and $258_i$. PN generator $253_i$ along with all other PN generators and Walsh generators at the cell-site provide an output at 1.2288 MHz. It should be noted that PN generator $253_i$ includes a decimator which provides an output at a 19.2 kHz rate to exclusive-OR gate $252_i$.

The other input of exclusive-OR gate $256_i$ receives a $PN_I$ signal while the other input of exclusive-OR gate $258_i$ receives a $PN_Q$ signal. The $PN_I$ and $PN_Q$ signals are pseudorandom noise sequences corresponding to a particular cell sector or address, and relate respectively to the In-Phase (I) and Quadrature (Q) channels. The $PN_I$ and $PN_Q$ signals are respectively exclusive-OR'ed with the output of exclusive-OR gate $251_i$ and respectively provided as inputs to Finite Impulse Response (FIR) filters $260_i$ and $262_i$. The input symbols are filtered according to the input data rate label (not shown) from convolutional interleaver $251_i$. The filtered signals output from FIR filters $260_i$ and $262_i$ are provided to a portion of transmit power control circuitry comprised of gain control elements $264_i$ and $266_i$. The signals provided to gain control elements $264_i$ and $266_i$ are gain controlled in response to input signals (not shown) from the control processor. The signals output from gain control elements are provided to transmit power amplifier circuitry.

FIG. 5 further illustrates voice channel (j) which is identical in function and structure to voice channel (i). It is contemplated that there exist many more voice channels (not illustrated), where an arbitrarily large number of channels may be accommodated by expanding the size of Table I.

Figure 6:
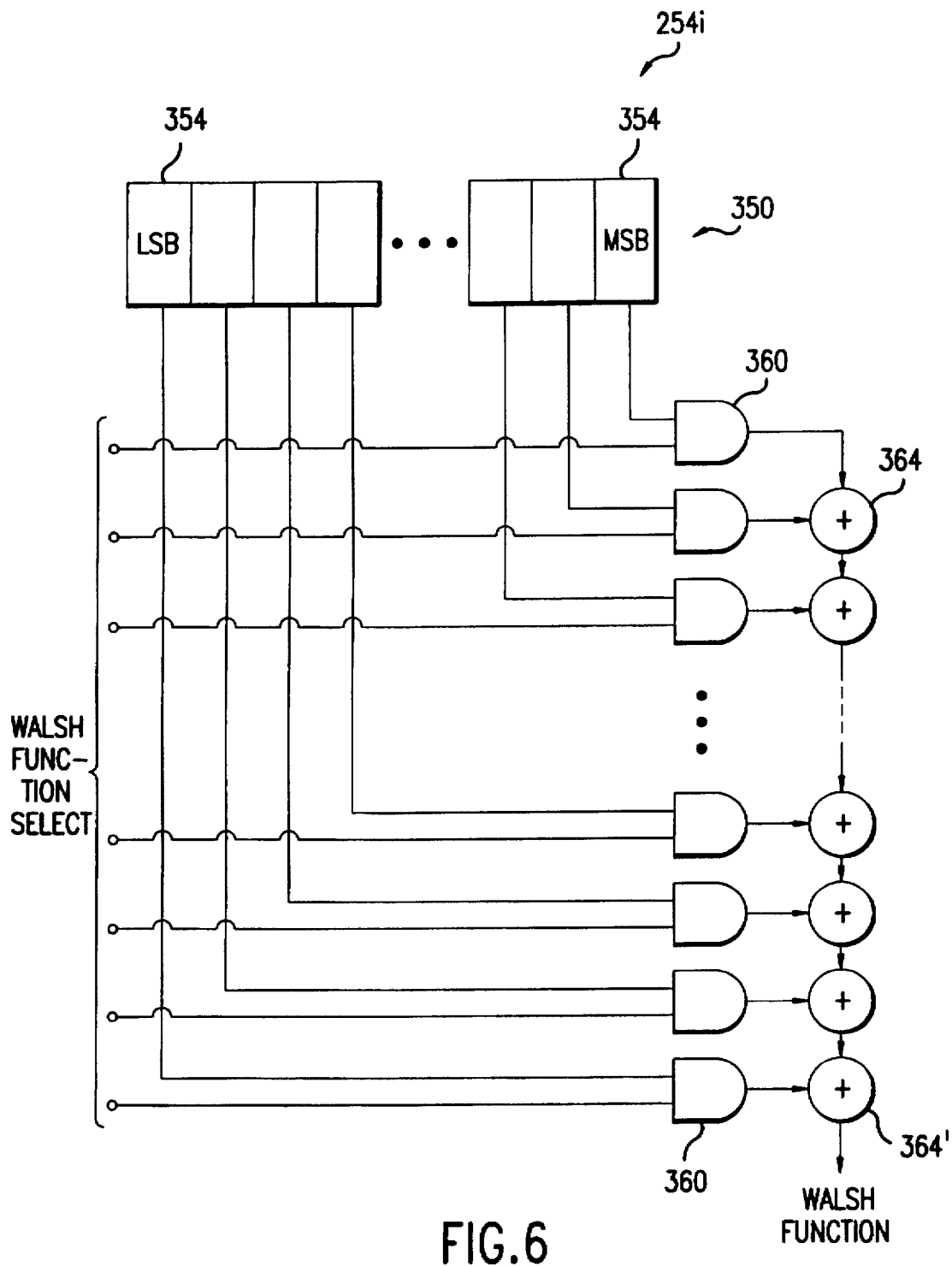
FIG. 6 provides a block diagrammatic representation of a Walsh function generator.

FIG. 6 provides a block diagrammatic representation of a preferred implementation of the Walsh generator $254_i$ shown in FIG. 5. The generator $254_i$ includes an N-bit binary counter 350, to which is provided a clock signal at a frequency equivalent to the 1.2288 MHz spread spectrum chip rate used in the exemplary embodiment. The number, N, of bit registers 354 in the binary counter 350 is determined by the ratio of the log (base 2) of the spread spectrum chip rate to the lowest desired channel symbol rate. For example, N=10 in a system operative at a chip rate of 1.2288 MHz in which the lowest data rate is 1200 symbols/second.

Each bit register 354 is connected to an input of an AND gate 360. The remaining input to each AND gate 360 is provided by one of the control bits within a N-bit Walsh Function Select word supplied by the control processor 48. As shown in FIG. 6, each of the AND gates 360 drives one of N-1 exclusive-OR gates 364. The AND gates 360 are connected with the exclusive-OR gates 364 such that the logical parity function of the word defined by the outputs of the AND gates 360 is produced at the output of the exclusive-OR gate 364'.

The Walsh generator of FIG. 6 is capable of generating Walsh functions of length $2^n$, for n=1, 2, ... N in accordance with the 10-bit Walsh function select signal. In the exemplary embodiment, the Walsh generator $254_j$ will be substantially identical to the generator $254_i$.

In the exemplary embodiment for the cell-to-mobile link, the voice channels use convolutional encoding of a constraint length K=9 and code rate r=1/2, that is, two encoded symbols are produced and transmitted for every information bit to be transmitted. In addition to the convolutional encoding, convolutional interleaving of symbol data is also employed. It is further envisioned that repetition is utilized in conjunction with the convolutional encoding. At the mobile unit, the optimum decoder for this type of code is the soft decision Viterbi algorithm decoder. A standard design can be used for decoding purposes. The resulting decoded information bits are passed to the mobile unit digital baseband equipment.

Referring again to FIG. 5, the transmitter circuitry includes a series of digital to analog (D/A) converters for converting the digital information from the $PN_I$ and $PN_Q$ spread data for the voice channels to analog form. In particular, the voice channel $PN_I$ spread data is output from gain control elements $264_i$–$264_j$ to D/A converters $280_i$–$280_j$, respectively. Similarly, the output of the corresponding gain control elements for $PN_Q$ spread data, i.e. gain control elements $264_i$–$264_j$, are respectively provided to D/A converters $282_i$–$282_j$. The digitized data from the D/A converters is mixed with an RF signal so as to provide frequency upconversion. In accordance with well-known techniques, the resulting RF signal will typically be bandpass filtered and amplified prior to transmission.

Cell-site control processor 48 (FIG. 3) has the responsibility for assignment of digital data receivers and transmit modulators to a particular call. Control processor 48 also monitors the progress of the call, quality of the signals, and initiates teardown on loss of signal. The cell-site communicates with the MTSO via link 52 where it is coupled by a standard telephone wire, optical fiber, or microwave link.

The control processor 48 also has responsibility for assignment of digital data receivers and modulators at the cell-site to handle particular calls. Thus, in the cell-to-mobile link, the control processor controls the assignment of Walsh sequences used at the cell-site in transmission of a particular call to the mobile unit. In addition, the system control processor controls the receiver Walsh sequences and PN codes. In the mobile-to-cell link, the control processor within the mobile unit also controls the mobile unit user PN codes for the call. Assignment information is therefore transmitted from the MTSO to the cell-site and from there to the mobile. The control processor within the mobile unit also monitors the progress of the call, the quality of signals, and initiates tear down on loss of signal.

In general, it is not expected that the mobile-to-cell link will not employ orthogonal Walsh coding in the manner described above. However, in particular applications it may be advantageous to use the same modulation scheme on the cell-to-mobile and mobile-to-cell links. Under these circumstances each mobile would utilize the pair of 32768 length sector codes as outer codes. The inner code would utilize a Walsh sequence, of the length chosen for voice channels, that is assigned to the mobile for use while it is in that sector. Nominally, the same Walsh sequence would be assigned to the mobile for the mobile-to-cell link as is used for the cell-to-mobile link.

In an alternative approach a rate r=1/2, constraint length K=9 convolutional code could be used with differential binary phase shift keying modulation of the encoded binary symbols. The demodulator in the cell-site could build up a phase reference over a short interval using the technique described in the article "Nonlinear Estimation of PSK-Modulated Carrier with Application to Burst Digital Transmission," Andrew J. Viterbi and Audrey M. Viterbi, *IEEE Transactions On Information Theory*, Vol IT-29, No. 4, July, 1983. For example, a phase reference could be averaged over only 4 symbols requiring no more channel coherence than in the above-described scheme.

Figure 7:
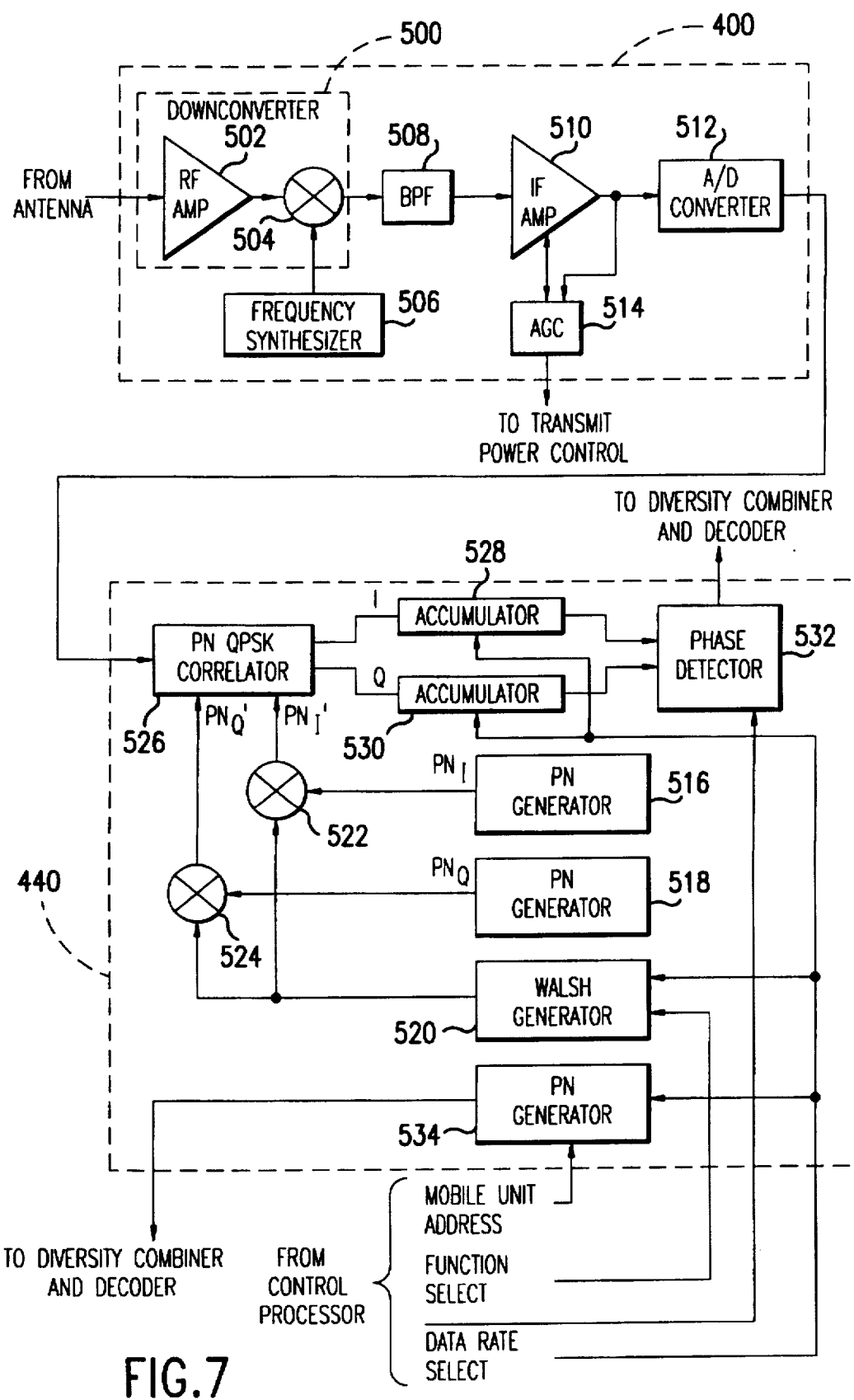
FIG. 7 provides a block diagrammatic representation of an exemplary pair of receivers included within a mobile unit CDMA telephone set.

FIG. 7 provides a block diagrammatic representation of an analog receiver 400, and digital data receiver 440, included within an exemplary mobile unit CDMA telephone set. Signals directed to receiver 400 from a mobile unit antenna (not shown) are provided to a downconverter 500 comprised of RF amplifier 502 and mixer 504. The received signals are provided as an input to RF amplifier 502 where they are amplified and output as an input to mixer 504. Mixer 504 is provided with another input, that being the signal output from frequency synthesizer 506. The amplified RF signals are translated in mixer 504 to an IF frequency by mixing with the frequency synthesizer output signal.

The IF signals are output from mixer 504 to bandpass filter (BPF) 508, typically a Surface Acoustic Wave (SAW) filter having a passband of approximately 1.25 MHz, where they are from bandpass filtered. The characteristics of the SAW filter are chosen to match the waveform of the signal transmitted by the cell-site. The cell-site transmitted signal is a direct sequence spread spectrum signal that is modulated by a PN sequence clocked at a predetermined rate, which, as noted above, is 1.2288 MHz in the exemplary embodiment.

The filtered signals are output from BPF 508 as an input to a variable gain IF amplifier 510 where the signals are again amplified. The amplified IF signals are output from IF amplifier 510 to analog to digital (A/D) converter 512 where the signals are digitized. The conversion of the IF signal to a digital signal occurs at a 9.8304 MHz clock rate in the exemplary embodiment, which is exactly eight times the PN chip rate. The digitized IF signals are output from (A/D) converter 512 to the data receiver 440.

Further details of data receiver 440 are depicted in FIG. 7. Data receiver 440 includes PN generators 516 and 518 which generate the $PN_I$ and $PN_Q$ sequences in a manner corresponding to that used to generate the PN sequences at the cell-site. Timing and sequence control signals are provided to PN generators 516 and 518 from a mobile unit control processor (not shown). Data receiver 440 also includes Walsh generator 520 which provides the appropriate Walsh function for communication with the mobile unit by the cell-site. Walsh generator 520 generates, in response to timing signals (not shown), a data rate select signal, and a function select signal from the mobile unit control processor corresponding to an assigned Walsh sequence. The function select, and data rate select signals are transmitted to the mobile unit by the cell-site as part of the call set up message. The $PN_I$ and $PN_Q$ sequences output from PN generators 516 and 518 are respectively input to exclusive-OR gates 522 and 524. Walsh generator 520 provides its output to both of exclusive-OR gates 522 and 524 where the signals are exclusive-OR'ed and output as the sequences $PN_I'$ and $PN_Q'$.

The sequences $PN_I'$ and $PN_Q'$ are provided to receiver 440 where they are input to PN QPSK correlator 526. PN correlator 526 may be constructed in a manner similar to the PN correlator of the cell-site digital receivers. PN correlator 526 correlates the received I and Q channel data with the $PN_I'$ and $PN_Q'$ sequences and provides correlated I and Q channel data output to corresponding accumulators 528 and 530. Accumulators 528 and 530 accumulate the input information over a period of one symbol, where the number of chips per symbol is equivalent to the Walsh sequence length corresponding to the selected data rate. This information is provided to the accumulators 528 and 530 via the data rate select signal from the control processor. The accumulator outputs are provided to phase rotator 532, which also receives a pilot phase signal from the mobile unit control processor. The phase of the received symbol data is rotated in accordance with the phase of the pilot signal as determined by the control processor. The output from phase detector 532 is the I channel data which is provided to the deinterleaver and decoder circuitry.

Data receiver 440 also includes PN generator 534 which generates the user PN sequence in response to an input mobile unit address or user ID from the mobile unit control processor. The PN sequence output from PN generator 534 is provided to diversity combiner and decoder circuitry. Since the cell-to-mobile signal is scrambled with the mobile user address PN sequence, the output from PN generator 534 is used in descrambling the cell-site transmitted signal intended for this mobile user. PN generator 534 specifically provides the output PN sequence to the deinterleaver and decoder circuitry where it is used to descramble the scrambled user data. Although scrambling is discussed with reference to a PN sequence, it is envisioned that other scrambling techniques, including those well known in the art, may also be utilized.

The symbol outputs of the phase detector 532 and the PN generator 534 are provided to diversity combiner and decoder circuitry (not shown). The diversity combiner circuitry adjusts the timing of the two streams of received symbols so as to bring them into alignment, and then adds them together. This addition process may be proceeded by multiplying the two streams by a number corresponding to the relative signal strengths of the two streams. This operation can be considered a maximal ratio diversity combiner. The resulting combined signal stream is then decoded using a forward error detection (FEC) decoder.

Each mobile unit will also generally include baseband circuitry for processing the signals generated by the diversity combiner and decoder. Exemplary baseband circuitry may include a digital vocoder of a variable rate type as disclosed in the previously mentioned copending patent application. Such baseband circuitry further serves as an interface with a handset or any other type of peripheral device. In this connection exemplary baseband circuitry is designed to provide output information signals to the user in accordance with the information provided from the diversity combiner and decoder.

It is noted that the cell-to-mobile and mobile-to-cell links need not be capable of accommodating an identical set of data rates. In particular, mobile terminals operative to transmit information at a subset of the cell-to-mobile data rates are not required to be designed to generate Walsh codes at other rates. It follows that existing mobile units may be incorporated into a variable data rate CDMA cellular system having a cell-to-mobile link implemented in accordance with the invention.

Although in the exemplary embodiment described above a single Walsh code sequence remains assigned to a given voice channel for the duration of the mobile telephone call, the present invention is not limited to such an implementation. In particular, under certain conditions it is conceivable that efficiency could be enhanced by changing the length of the assigned Walsh sequence while a call is in progress. This type of scheme would likely be effected by monitoring voice activity in a manner facilitating periodic reassignment of, for example, codes of relatively shorter length to channels characterized by higher levels of voice activity or higher rates of data transmission.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

I claim:

1. A modulation system for use in a spread spectrum communications system, said modulation system being disposed to transmit an information signal, comprising:

means for selecting a first function from a set of functions in accordance with a selected characteristic of said information signal, said set of functions including a plurality of subsets of functions, wherein a predefined recursive relationship exists among the functions within each of said subsets, said means for selecting including means for preventing selection of more than a single function from each of said subsets, and members of said subsets are orthogonal to members of all other subsets;

means for generating a function signal representative of said first function;

means for generating a pseudorandom noise (PN) signal of a predetermined PN code; and means for combining said function signal, said PN signal and said information signal, and for providing a resultant first modulation signal.

2. The system of claim 1 wherein said set of functions are generated from the Walsh functions of varying length means for selecting an orthogonal function includes means for deriving said set of functions by generating a set of Walsh functions of variable length.

3. The system of claim 2 wherein said means for selecting further including means for identifying as available for selection a subset of said set of Walsh functions on the basis of said data rate.

4. The system of claim 2 wherein said means for generating said set of orthogonal Walsh functions includes means for recursively deriving a set of orthogonal Walsh functions of varying length from a root function.

5. The system of claim 4 further including controller means for preventing subsequent selection of ones of said Walsh functions within said subset of Walsh functions upon selection of one of said Walsh functions within said subset of Walsh functions.

6. The system of claim 5 wherein said controller means includes means for preventing selection of said root Walsh sequence when said selected orthogonal function consists of one of said Walsh sequences within said set of Walsh sequences.

7. The system of claim 4 wherein selected ones of said Walsh sequences are of a length equivalent to a maximum power of two, and remaining ones of said Walsh sequences are of lengths equivalent to predetermined powers of two less than said maximum power of two.

8. The system of claim 2 wherein said predefined characteristic corresponds to a data rate of said information signal.

9. The system of claim 1 further comprising encoder means for receiving and error correction encoding said information signal, and for providing an error correction encoded information signal to said means for combining for combination with said orthogonal function signal.

10. The system of claim 1 further including means for generating a set of orthogonal Walsh functions comprising said set of orthogonal functions, said set including subsets of said orthogonal Walsh functions derived from root functions of said subsets; and controller means for tracking which of said root functions are being used in said communication system, and for designating as unavailable those functions included within the subsets associated with said root functions being used.

11. The system of claim 1 further including means for preserving for selection at least a first of said orthogonal functions included in a first of said subsets.

12. The system of claim 1 further including means for deselecting at least one previously selected orthogonal function within a given one of said subsets in order to make available for selection another orthogonal function in said given subset.

13. A spread spectrum modulator for processing first and at least a second digital user information signals in preparation for respective transmission to first and second intended recipient users, comprising:

means for selecting first and second functions from a plurality of functions in accordance with first and second data rates of said first and second information signals, respectively, said plurality of functions being divided into a plurality of subsets wherein a redefined recursive relationship exists among the functions within each of said subsets, said means for selecting including means for preventing selection of more than a single function from each of said subsets;

function generator means for generating first and second Walsh function signals corresponding to said first and second functions;

first combiner means for providing a first intermediate modulation signal by combining said first information signal and said first Walsh function signal, and for providing a second intermediate modulation signal by combining said second information signal and said second Walsh function signal;

pseudorandom noise (PN) generator means for generating a PN signal of a predetermined code function;

second combiner means for providing a first output modulation signal by combining said PN signal and said first intermediate signal, and for providing a second output modulation signal by combining said PN signal and said second intermediate signal.

14. The modulator of claim 13 wherein said first and second digital user information signals are comprised of frames of variable rate vocoded voice data.

15. A signal modulation method for for use in a spread spectrum communication system within which is processed at least a first information signal, comprising the steps of:

selecting an function from a plurality of functions in accordance with a predefined characteristic of said information signal, said set of functions including a plurality of subsets of functions wherein a predefined relationship exists among the functions within each of said subsets, said step of selecting including the step of preventing selection of more than a single function from each of said subsets;

generating an function signal representative of said selected function; generating a pseudorandom noise (PN) signal of a predetermined PN code;

combining said function signal, said PN signal and said first information signal, and providing a resultant first modulation signal.

16. The method of claim 15 further including the step of generating said plurality of orthogonal functions by generating a set of orthogonal Walsh functions in which a subset of said set of orthogonal Walsh functions is derived from a root one of said Walsh functions.

17. The method of claim 16 further including the step of preventing selection of ones of said Walsh functions within said set of Walsh functions upon selection of one of said Walsh functions within said set of Walsh functions.

18. The method of claim 15 further including the step of preserving for selection at least a first of said orthogonal functions included in a first of said subsets.

19. The method of claim 15 further including the step of deselecting at least one previously selected orthogonal function within a given one of said subsets in order to make available for selection another orthogonal function in said given subset.

20. A method for processing first and second digital user information signals for respective transmission to at least first and second intended recipient users, comprising the steps of:

selecting first and second orthogonal functions from a plurality of orthogonal functions in accordance with first and second data rates of said first and second information signals, respectively, said orthogonal functions being divided into a plurality of subsets wherein a predefined recursive relationship exists among the orthogonal functions within each of said subsets, said means for selecting including means for preventing selection of more than a single orthogonal function from each of said subsets;

generating first and second Walsh function signals corresponding to said first and second orthogonal functions;

providing a first intermediate modulation signal by combining said first information signal and said first Walsh function signal, and providing a second intermediate modulation signal by combining said second information signal and said second Walsh function signal;

generating a pseudorandom noise (PN) signal of a predetermined code function;

providing a first output modulation signal by combining said PN signal and said first intermediate signal, and providing a second output modulation signal by combining said PN signal and said second intermediate signal.

21. The method of claim 20 further including the steps of:

generating first and second sets of Walsh function signals of varying length from said first and second Walsh function signals, respectively;

designating as unavailable said first Walsh signal upon selection of one of said Walsh function signals included within said first set, and designating as unavailable said second Walsh function signal upon selection of one of said Walsh function signals included within said second set; and assigning to users ones of said Walsh function signals so as to minimize the number of Walsh function signals designated as unavailable.

22. A modulation system for use in a spread spectrum communication system, said modulation system being disposed to receive an information signal, comprising:

means for selecting an orthogonal function from a set of functions in accordance with a selected characteristic of said information signal, said set of functions including a plurality of orthogonal functions divided into a plurality of subsets wherein a predefined recursive relationship exists among the orthogonal functions within each of said subsets, said means for selecting including means for preventing selection of more than a single orthogonal function from each of said subsets;

means for generating an orthogonal function signal representative of said selected orthogonal function; and means for combining said orthogonal function signal and said information signal, and for providing a resultant first modulation signal.

23. The system of claim 22 wherein said means for selecting an orthogonal function includes means for deriving said set of functions by generating a set of Walsh functions of variable length.

24. The system of claim 23 wherein said predefined characteristic corresponds to a data rate of said information signal, said means for selecting further including means for identifying as available for selection a subset of said set of Walsh functions on the basis of said data rate.

25. The system of claim 22 further including means for deselecting at least one previously selected orthogonal function within a given one of said subsets in order to make available for selection another orthogonal function in said given subset.

* * * * *